Dec. 9, 1930.         B BRONSON         1,784,782
COMPOSITE RUNNING BOARD
Original Filed Dec. 22, 1927
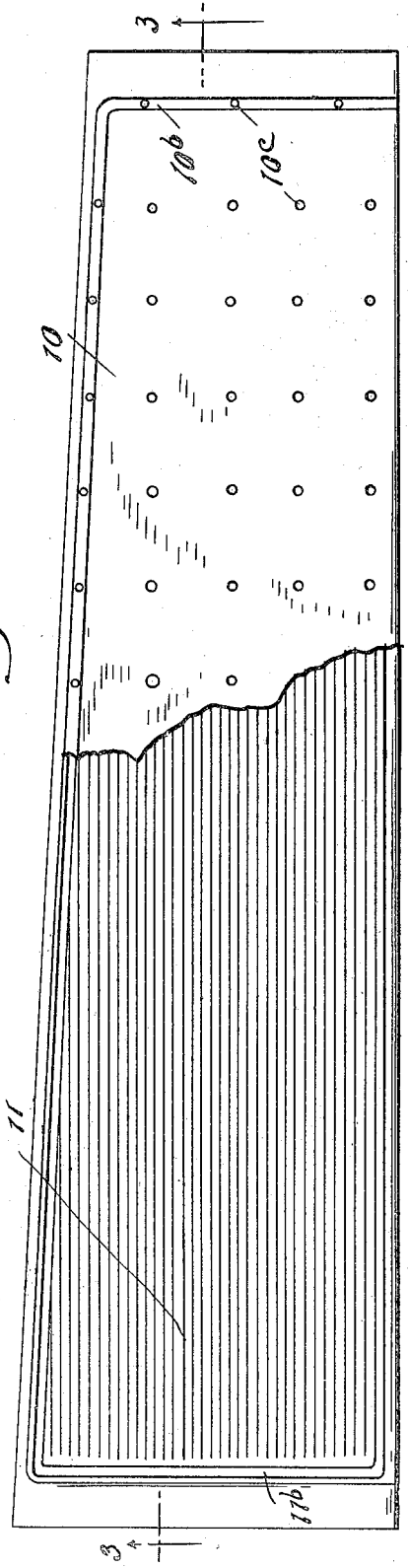

Patented Dec. 9, 1930

1,784,782

UNITED STATES PATENT OFFICE

BUDD BRONSON, OF CLEVELAND, OHIO, ASSIGNOR TO THE OHIO RUBBER COMPANY, OF CLEVELAND, OHIO, A CORPORATION OF OHIO

COMPOSITE RUNNING BOARD

Original application filed December 22, 1927, Serial No. 241,771. Divided and this application filed October 13, 1930. Serial No. 488,517.

This invention relates to a steel and rubber article of the type wherein rubber or equivalent non-metallic composition is attached by vulcanization or equivalent treatment to a metal base such as a base stamped from rolled sheet metal.

More particularly, the invention relates to running boards for motor vehicles formed from an elongated stamped sheet metal body with a layer of rubber vulcanized and interlocked to the running board body.

This application is a division of my copending application Serial No. 241,771, filed December 22, 1927, which embraces claims to structure illustrated and described, but not claimed, herein.

An object of the present invention is to provide a running board or equivalent member of satisfactory form and construction and wherein the non-metallic covering is so effectively fastened to the metal body that it is not likely to become loosened or torn from place due to the rough usage to which an article of this kind is normally subjected.

Another object of this invention is to provide a running board of the type mentioned wherein non-metallic tread material is molded and attached to a metal body formed of hot-passed steel and having a surface roughness inherent to hot-passed steel.

The invention may be briefly summarized as consisting in certain novel details of construction and combinations and arrangements of parts which will be described in the specification and set forth in the appended claims.

In the accompanying sheet of drawings, Fig. 1 is a top plan view of a running board formed in accordance with my invention; Fig. 2 is a transverse sectional view on an enlarged scale, and Fig. 3 is a longitudinal sectional view taken substantially along the line 3—3 of Fig. 1. In Fig. 1 a portion of the rubber covering is broken away to show the metal base beneath.

Referring now to the drawings, the running board body is designated 10, this body being formed from rolled steel and stamped into the shape illustrated. However, before describing the details of the body 10, it might be stated that it is an important feature of the invention that the covering of non-metallic material, in this instance rubber, is very uniformly attached to the metal base or body by mechanically interlocking the rubber and metal along the margin and at spaced points inside the margin, and also by a firm, uniform adherence of the rubber to the metal body secured when the rubber is molded and vulcanized to the body. This latter feature is due to the fact that I employ a metal base stamped from sheet metal of the kind which is known commercially as hot-passed steel. That is to say, in forming the metal base I employ a sheet of metal the final rolling of which is imparted while the sheet is in a hot state, thereby obtaining a surface roughness or porosity which is peculiarly efficacious in securing a firm and uniform bond between the rubber and steel. The sheet steel generally used in automobile constructions is very smooth-surfaced, due to the fact that the final passing takes place while the steel is in a cold state, but with steel of that character the strong adherence of the rubber to the steel is not obtainable. However, by using hot-passed steel, the desired clinging of the rubber to the steel is obtained, this being preferably supplemented by the mechanical interlocking to be referred to presently.

Although, as mentioned above, the form of the running board illustrated herein has been claimed in my copending application, I shall describe that construction briefly hereinafter, as being illustrative of one embodiment which my present invention may assume. The metal base or body 10 is flanged downwardly along both sides and ends, as illustrated at 10ª, this being for the purpose of stiffening the body, to provide means for conveniently attaching the running board to certain parts of the vehicle such as the splash pan and fenders, and also to provide for the covering of the front edge surface of the running board body with the rubber. Additionally, there may be formed within the margins of the metal body a shallow depression. This depression extends over the major portion of the top surface of the metal body and is carried over and downward for a distance onto the front flange 10ª, as is clearly illustrated in Fig. 2. There may also be provided along the margin of that portion of the depression which occupies the top surface of the running board body, a trough-like groove 10ᵇ. That is to say, this groove extends along the back and across the ends of the depression, but is preferably not carried down the front flange 10ª.

The covering of non-metallic material is indicated at 11, this covering consisting preferably of rubber or rubber composition. It is of course applied to the running board body in an unvulcanized state, and it is molded and vulcanized to the metal body in a suitable vulcanizing press. In the molding operation, the top surface of the rubber is given a suitable pattern or configuration which in this instance consists of longitudinal ribbing, and at the same time the rubber is caused to adhere to the rough surface of the metal body (inherent to the hot-passed steel) by being forced into the minor pores and interstices or against the roughened surface, and it is also mechanically interlocked to the metal body. This mechanical interlocking is obtained in this case by providing in the metal base a large number of perforations 10ᶜ which are arranged in the base of the groove 10ᵇ so that the rubber will be interlocked along its margin where the greatest holding power is desired, and these perforations are arranged also at intervals inside the margin, there also being a row along the front downturned flange 10ª. In the molding and vulcanizing operation, the rubber is squeezed through these perforations and the equivalent of rivet heads, indicated at 11ª, are formed on the under or inner side of the metal base, which rivet heads are obtained by forming slight depressions in the lower member of the vulcanizing press directly beneath or opposite the perforations 10ᶜ.

By this invention, there is produced a running board having a tread or covering of rubber which covers the major portion of the top of the running board body and in this instance extends down to cover the front lip or flange, the rubber in the molding and vulcanizing operation being uniformly attached to the steel by the adherence of the rubber to the surface of the metal, and, additionally, it is mechanically interlocked with the metal base. By causing the rubber to be fastened to the metal body in the manner described above, the rubber is held so securely that it does not pull loose by rough usage, including the action of the feet in entering or leaving the car or accidental kicking of the front edge of the board.

Having thus described my invention, I claim:

1. A running board having a sheet metal body formed of hot-passed steel with surface roughness inherent to hot-passed steel and having a covering of rubber molded and vulcanized to the body and uniformly attached thereto by its adherence with said roughened surface of the metal.

2. A running board having a sheet metal body formed of hot-passed steel with surface roughness inherent to hot-passed steel and having a covering of rubber molded and vulcanized to the body and uniformly attached thereto by its adherence with said roughened surface of the metal, and also being interlocked with the metal along its margin and inside its margin.

In testimony whereof, I hereunto affix my signature.

BUDD BRONSON.